C. R. SEAQUIST.
VESSEL.
APPLICATION FILED OCT. 11, 1912.
1,075,160.
Patented Oct. 7, 1913.
2 SHEETS—SHEET 1.
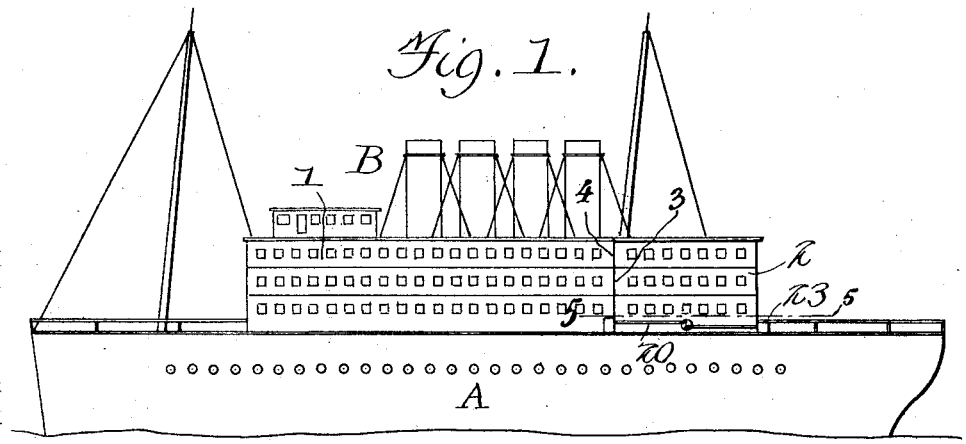
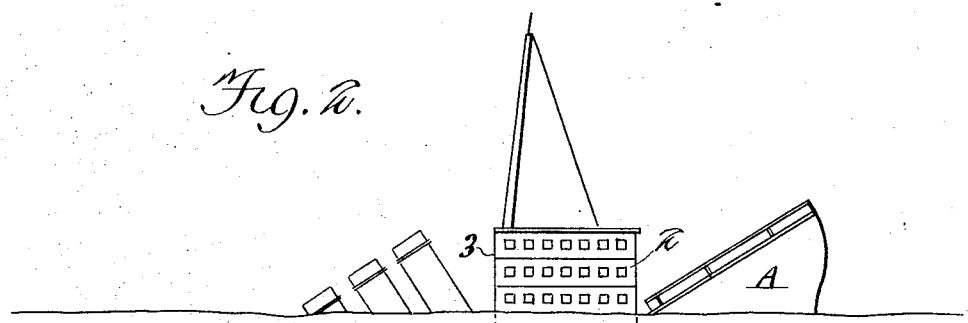
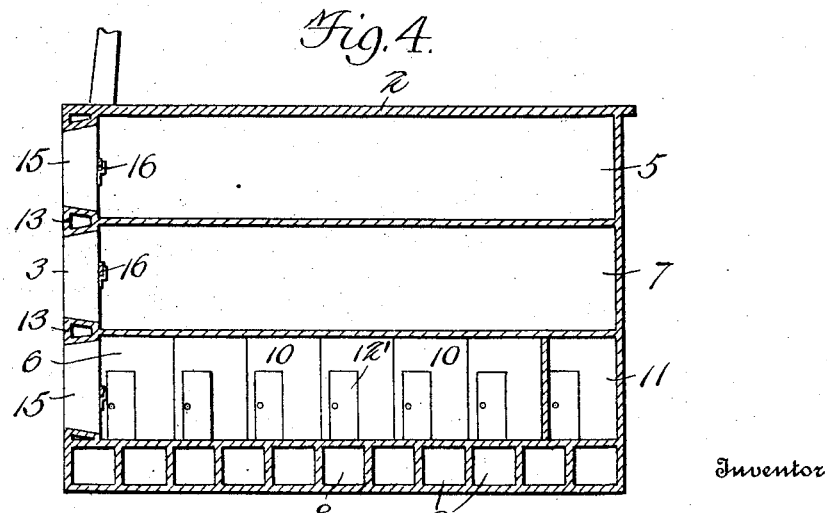
Witnesses
Hugh H. Ott.
A. L. Evans
Inventor
Carl R. Seaquist
By Victor J. Evans
Attorney C. R. SEAQUIST.
VESSEL.
APPLICATION FILED OCT. 11, 1912.
1,075,160.
Patented Oct. 7, 1913.
2 SHEETS—SHEET 2.
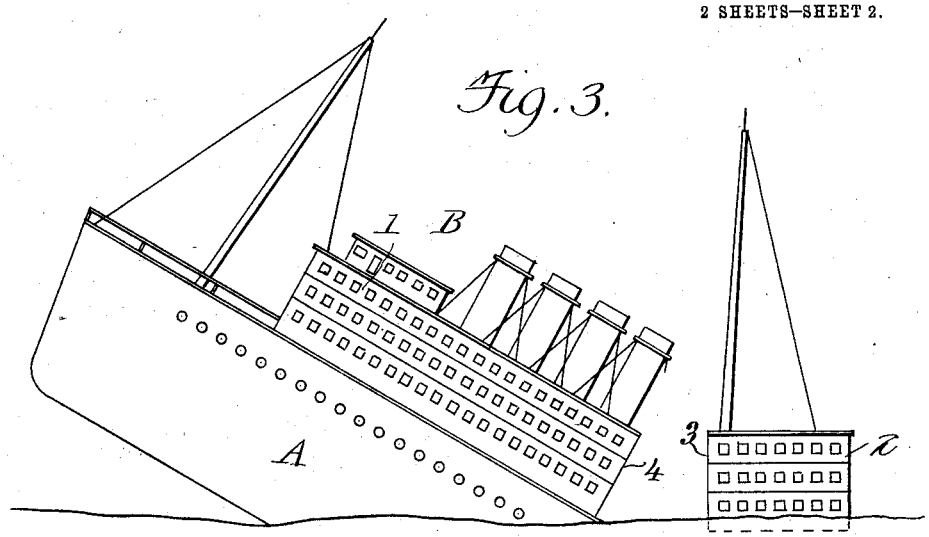
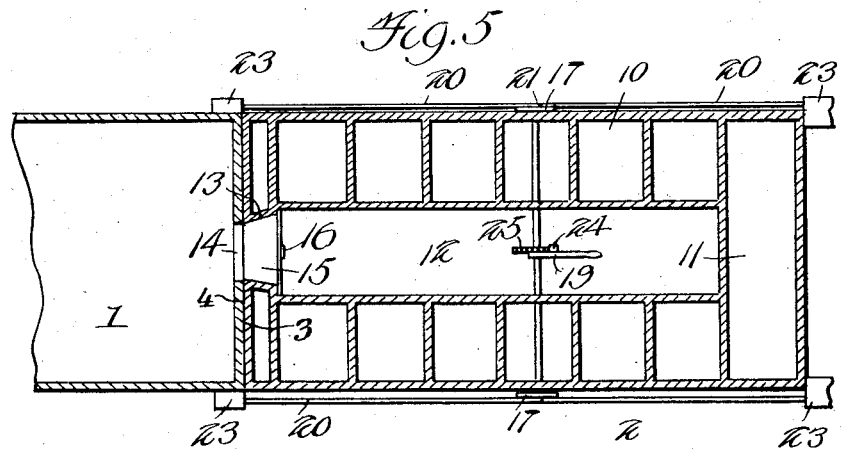
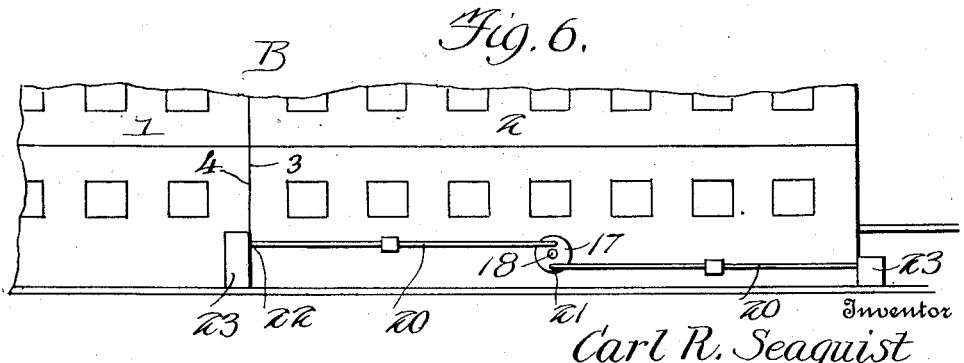
Witnesses
Hugh H. Ott
A. L. Evans.
Inventor
Carl R. Seaquist
By Victor J. Evans
Attorney

UNITED STATES PATENT OFFICE.

CARL R. SEAQUIST, OF SISTER BAY, WISCONSIN.

VESSEL.

1,075,160.  Specification of Letters Patent.  Patented Oct. 7, 1913.

Application filed October 11, 1912. Serial No. 725,234.

*To all whom it may concern:*

Be it known that I, CARL R. SEAQUIST, a citizen of the United States, residing at Sister Bay, in the county of Door and State of Wisconsin, have invented new and useful Improvements in Vessels, of which the following is a specification.

This invention relates to vessels and particularly to ocean traveling vessels, and has for an object to provide life saving apparatus therefor which will consist in constructing the cabin of the vessel of separable fore and aft portions; the construction of the aft portion being such that it will be buoyant whereby it will float upon the water when separated from the fore portion; further, the construction of said aft portion and the relative association of the same with the fore portion to establish direct communication therewith to permit the passengers to quickly find refuge therein when danger arises.

Another object of the invention is to provide means whereby the aft portion of the cabin will be released to the water in an expeditious manner, regardless of the sinking angle of the vessel.

Another object of the invention is to provide means for rendering the floating cabin portion water tight on its immediate release from the fore portion of the cabin.

In the drawings; Figure 1 is a side view of a vessel showing the application of the invention thereto. Fig. 2 is a similar view, showing the bow of the vessel submerged and illustrating the launching of the aft portion of the cabin; Fig. 3 is a similar view, showing the stern submerged during the sinking progress of the vessel and illustrating the detached condition of the aft portion of the cabin; Fig. 4 is a vertical longitudinal section through the companion cabin portions of the vessel. Fig. 5 is a horizontal section on line 5—5 of Fig. 1. Fig. 6 is a side view on an enlarged scale, showing the locking means for securing the aft section upon the deck.

The vessel A herein illustrated may be of any well known construction as regards its various parts, excepting the cabin B, which I desire to consist of a permanent fore section 1 and a detachable aft section 2. The section 2 of the cabin preferably has a height equal to that of the permanent section, while its length is relatively reduced as compared with said section and otherwise arranged whereby it will at a time of emergency accommodate all the passengers of the permanent section. The construction, is also such that commodious conditions of the permanent section will be obtained under the usual accommodation of the passengers. The vertical front wall 3 of the section 2 lies in mutual contact with the rear wall 4 of the section 1 whereby the latter serves as a guard to protect said section 2 from excessive water pressure when the vessel sinks bow first.

The cabin section 2 is divided to provide an upper saloon 5, a lower compartment 6 and an intermediate saloon 7 and a buoyant hull 8. The hull may be of any suitable well known construction which may be found best suited for the purpose, and as shown herein it is composed of separate air cells or compartments 9 whereby destruction of a particular portion of the hull will not materially cripple the buoyancy of the object. The compartment 6 is subdivided to provide longitudinal rows of rooms 10 and transverse rows of rooms 11, and a central large chamber 12, the latter being adapted to communicate directly with either of the rooms 10 and 11 by doors 12′ in the latter, as shown. The rooms 10 and 11 may be used for the storage of valuables or to accommodate passengers as may be deemed advisable.

With a view to facilitating the transfer of the passengers from the cabin portion 1 to the cabin portion 2, I provide in one wall of each of the saloons 5 and 7 and the compartment 6 a doorway 13 which alines with a similar doorway 14 in the adjacent saloon of the cabin section 1 as shown in Figs. 4, 5 and 6 so that direct communication between the respective cabin sections can be established when desired. Each doorway 13 carries a swinging door 15 which may be closed to render the compartments water-tight. It is also stated that locking means 16 may be engaged with the door to hold the same against the pressure of the water when the cabin section 2 is in the position shown in Fig. 3.

In order that the cabin section 2 may be held properly anchored upon the deck of the vessel and operatively associated with the section 1 under ordinary conditions, and to insure an immediate release of said section from the vessel at a time of emergency, I provide disks 17, located at the opposite sides of said section and secured to the ends of a controlling shaft 18. This shaft extends into the space 12 of the compartment 6 where it is provided with an actuating lever 19. Oppositely movable bolts 20 are slidably mounted on the sides of the compartment, being pivotally connected at 21 with the disks and operatively extended at 22 into keepers 23 which rise from the deck of the vessel. A locking dog 24 on the lever 19 is adapted to engage with a rack segment 25 whereby the bolts can be held against sliding movements.

Now that the details of construction of the safety attachment are clearly described, it is said that when it is seen that the ship is sinking, the bolts 20 of the locking means are disengaged from the keepers 23 whereby the cabin portions become separated to permit an immediate launching of the sections 2 when it reaches the surface of the water as shown in Fig. 2.

Wireless signaling apparatus may be installed in the space 12 whereby the stranded passengers may communicate with nearby rescue vessels.

I claim:—

1. A vessel provided with normally communicating fore and aft cabin sections, the fore section being secured to the deck of the vessel, the aft section having adjustable engagement with the vessel, means for closing communication between the sections at the period of separation of the aft section from the deck, apertured keepers rising from the deck and arranged wholly without the plane of the aft section and disposed adjacent the corners thereof, a controlling shaft carried by the aft section, and rods connected with the controlling shaft and lying without the sides of the aft section and movable to engage in the keepers, so as to hold the aft sections operatively associated with the deck and fore section, respectively, and means for holding the controlling shaft normally against movement so as to effect confinement of the rods in the keepers.

2. A vessel having its cabin provided with a fixed fore portion and a detachable aft portion, keepers rising from the deck of the vessel and disposed immediately at the corners of the aft section, a controlling shaft carried by the aft section and provided at its ends with fixed disks, rods eccentrically mounted upon the disks and adapted to be projected into the keepers, a rack member, a lever carried by the shaft, and means on the lever operable to engage the rack member, so as to hold the shaft normally against movement.

In testimony whereof I affix my signature in presence of two witnesses.

CARL R. SEAQUIST.

Witnesses:
GEORGE M. PETERSON,
L. E. EVANSON.

Copies of this patent may be obtained for five cents each, by addressing the "Commissioner of Patents. Washington, D. C."